United States Patent [19]

Nilborn

[11] Patent Number: 5,758,016
[45] Date of Patent: May 26, 1998

[54] METHOD OF OBTAINING SAVING OF ENERGY AND APPARATUS FOR UTILIZATION IN SAID METHOD

[76] Inventor: Jan Nilborn, Rönncholmsvägen 27B, Malmö, Sweden, S-211 47

[21] Appl. No.: 491,916

[22] PCT Filed: Jan. 18, 1993

[86] PCT No.: PCT/SE93/00018

§ 371 Date: Jul. 18, 1995

§ 102(e) Date: Jul. 18, 1995

[87] PCT Pub. No.: WO94/16370

PCT Pub. Date: Jul. 21, 1994

[51] Int. Cl.$^6$ .................................. F24D 19/02
[52] U.S. Cl. .................. 392/370; 219/213; 392/407
[58] Field of Search .................. 392/370, 407, 392/429, 428, 436; 250/DIG. 1; 340/541; 338/303, 217, 208; 219/213, 220, 543

[56] References Cited

U.S. PATENT DOCUMENTS

| | | |
|---|---|---|
| 1,488,483 | 4/1924 | Ellis et al. . |
| 1,697,607 | 1/1929 | Maxson . |
| 2,165,970 | 7/1939 | Jaspers . |
| 4,031,353 | 6/1977 | Segura . |
| 4,990,747 | 2/1991 | Konda . |

FOREIGN PATENT DOCUMENTS

| | | |
|---|---|---|
| 2 620 801 A1 | 9/1987 | France . |
| 32 08 428 A1 | 9/1983 | Germany . |
| 61-280321 | 12/1986 | Japan . |
| 86-099026/15 | 9/1985 | U.S.S.R. . |

*Primary Examiner*—Tu B. Hoang
*Attorney, Agent, or Firm*—Cohen, Pontani, Lieberman, Pavane

[57] ABSTRACT

A method of, and an apparatus for, energy saving heating of premises in which people stay temporarily. According to the invention the premises are heated by conventional heating methods up to a temperature which is below comfortable temperature. When a human being stays in the premises, additional heat is supplied by radiation from a heat radiation transmitting device. This device can be heated, e.g. electrically or by gas. Associated with the device is a sensor, which controls the function of the device in respect of human presence in the premises.

9 Claims, 3 Drawing Sheets

5,758,016

METHOD OF OBTAINING SAVING OF ENERGY AND APPARATUS FOR UTILIZATION IN SAID METHOD

FIELD OF THE INVENTION

This invention relates to a method of energy conservation for heating premises in which people occupy temporarily. The invention also relates to a heat transmitting apparatus intended to be used in said method.

BACKGROUND OF THE INVENTION

In temperate and cold zones there are demands for heating dwellings, offices and the like to a comfortable temperature level during the cold months.

Presently available heating systems for dwellings, offices and the like are essentially based on convection. For example, radiators heat the indoor air which in turn provides warmth to the people.

The norms which govern the construction of these heating systems are traditionally based on theoretical conditions of an ideal room in which the average temperature of the enclosing surfaces of the room and of the enclosed air is in equilibrium. The standard calculation temperature is normally 20° C. The temperature range of physiological comfort or well-feeling of a person with normal indoor clothing is thought to be between 18° and 23° C., depending on the constitution of the body, age, etc. of a particular individual.

The temperature level of a room also depends on the amount of ventilation, i.e. movement of air in the room. The maximum standard velocity of air movement is 0.15 m/s. A higher level of ventilation results in a demand for raising the air temperature so as to compensate the convective cooling of e.g. bare skin.

When temperature equilibrium is attained according to the above, the temperature level of the floors, walls and ceilings is increased. This leads to loss of energy to the environment by heat transmission. Also the necessary ventilation means additional loss of energy. Both of these losses, which have to be compensated for maintaining the comfort level, can be considered to be directly proportional to and linearly dependent on the difference between the indoor temperature and the outdoor temperature.

Measures which have taken up until now to reduce the above-mentioned losses of energy, e.g. in directly heated houses, have, since the first energy crises at the beginning of the 1970's, primarily been directed to improving insulation in ceilings, walls and floors and to introducing double-glass and triple-glass windows and doors, so that the thermal transmission resistance (k-value) is increased or improved. Measures have also been implemented to control the necessary ventilation of the building, so that minimal heated air escapes into the surroundings.

Today, all economically defensible measures of this passive energy conservation type have essentially been taken. Further efforts can cause permanent damage (e.g. growth of mold, etc.) to the buildings.

Another measure of reducing the energy consumption and/or the costs of electrically heating buildings is to change the heating systems. One can install hot-water baseboard type heating systems, where the water in the system is heated, e.g. in a heat pump or an electric heating boiler, or in a forced-air system, in which indoor air is heated by means of heat pumps.

Generally, however, savings in energy costs is not in reasonable proportion to investment in energy conserving heating systems, i.e. the time to write-off is unreasonably long. Air heat pumps also have the general drawback that they become less effective as outdoor temperature drops.

Still another way to save energy is to lower the indoor temperature. This means, however, that occupants would find it necessary to put on more clothes. Accordingly one can then accommodate the lowering of indoor temperature by a couple of degrees, e.g. from 20° C. to 18° C. Further lowering of the temperature could mean the loss of indoor comfort even with the extra clothing.

It would be beneficial, if one could regulate the indoor temperature in such a way that the indoor temperature is lowered to e.g. 15° C. when people are not in the house or on the premises. Such a temperature should present no problem for the building proper furnishings, flowers or the like. Unfortunately this is not possible with today's heating systems. They react or regulate too slowly. It takes too long to heat or reheat those enclosing surfaces where people stay temporarily or continuously, i.e. the "stay zones", to a comfortable condition. Alternatively, it is possible to reduce the living space during the cold months and to maintain this space at a comfortable level, while the air temperature of the remaining part of the dwelling or premises is lowered to an "economizing level".

Reducing the energy consumption this way means, however, sacrificing some of the comfort since the amount of living space diminishes. On account hereof it could be said that this latter method of lowering indoor temperature does not afford a practical way of saving energy in an acceptable way. The inherent slownesses of conventional heating systems as well as the structure of the building in responding to temperature changes are some of the restricting factors.

SUMMARY OF THE INVENTION

The object of the present invention is to provide a method and a system for heating premises in an energy conserving way, which method and system makes it possible to maintain an indoor temperature achieved by means of conventionally heating a "stay zone" of the premises to about 5° C. below a physiologically comfortable level, without the above described restriction of the living space, while at the same time radiantly heating the zones where people stay temporarily or continually, i.e. the "stay zones", back to the physiologically comfortable level.

The present invention capitalizes on the slow psychological reaction of people to changes in temperatures. People can move freely within the entire space. Comfort is not lost despite the fact that people exit comfortable temperature zones and enter into zones which at their entrance have an air temperature of, e.g. 15° C., a physiologically uncomfortable level. These initially uncomfortable zones can be made comfortable very rapidly (within about 5–12 sec) by the method or system of the present invention. The radiant heat apparatus ensures that the desired feeling of comfort arises very rapidly in the stay zones after sensors in said apparatus detect presence of people in the zone. Within a short time after the last person leaves the zone, the supply of heat energy from the apparatus ceases, and the zone becomes uncomfortable again. These zones are normally about 12–15 $m^2$ in size.

Centrally above each of the areas where people stay temporarily or continuously, i.e. the stay zones, a heat radiating apparatus in accordance with the present invention is provided at ceiling level. This apparatus is preferably designed so that a predetermined initial surface temperature of about 170–220° C. is attained on its heat transmitting surface, which surface faces the stay zone of the room. The predetermined surface temperature is reached within a few seconds after the apparatus is turned on. Since the apparatus does not have a flat design, heat energy radiates diffusely into the room or zone. The pattern of radiation, or the distribution of the heat flux in the stay zone, is preferably uniformly distributed without dot-shaped or curtain-shaped concentrations. The heat energy supplied to the stay zone by the apparatus is felt by the people in the stay zone as an immediate or very rapid increase in the temperature of their surrounding air of about 5° C. This effect permits an initial maintenance of the indoor temperature at a corresponding number of degrees (i.e. 5° C.) below a temperature that is normally considered as the physiological level of comfort (i.e. 18° to 23°C.), and yet provide a pleasant feeling of comfort.

Proximate the center of the apparatus a sensor is provided which reacts as soon as someone enters the heating zone of the apparatus. Upon detection, the sensor actuates a control unit in the apparatus. This control unit in turn starts the supply of energy to elements located in the heat transmitting surfaces of the apparatus. A short time after the sensor detected the absence of a person in the heating zone, the control unit disconnects the supply of energy. The sensor may be of the same type as that utilized in alarm systems, e.g. burglar alarms, and can therefore also be utilized in a burglary alarm system which is activated when nobody is in the house.

The supplied energy can be in the form of electrical current or gas.

As was described above the heat flux in the stay zone is in the form of heat radiation. Heat rays are not of corpuscular nature but rather are electromagnetic oscillations having a wave length of about 0.8 μm–800 μm, the energy of which is absorbed and converted to heat energy only when they impinge upon matter, provided the matter does not reflect the radiation or lets it through completely. Although this particular type of radiation is within the optical range, it is not readily apprehended, or recognized by the human eye. But its effect is the production of heat on the human skin. Moreover, the energy is not absorbed by the air, through which the heat flux passes; thus the air is not heated primarily by the heat flux but secondarily by the surfaces receiving the radiation as the surfaces give off part of the absorbed energy, and by people and other heat sources. This secondary heating replaces, among other things, completely that part of the energy content of a conventional heating system, which energy is lost with the volume of heated air transported away by way of ventilation. Depending on the magnitude of the transmission losses with respect to the above-mentioned secondary energy, a slow increase in the air temperature can occur after a certain amount of time. This temperature change may be recorded by a control unit disposed in the apparatus. The control unit is so programmed that it always aims to achieve a correct or appropriate physiological-comfort relation between the temperature of the indoor air and the radiation energy supplied by the apparatus. If this relationship can be attained at a lower amount of supplied energy, the supply of energy is throttled. Accordingly no more than the necessary amount of energy is supplied from a physiological-comfort point of view.

Since there is not the same upward current of warm air as that caused by the conventional heating systems because the air temperature of the zone is lowered according to the invention, warm air is not accumulated near the ceiling. Measurements conducted in air conditioned or thermal chambers indicate that the temperature difference between a measurement point located in the ceiling and another point located 1.5 m above the floor level is minimal. The downward current of cold air at windows and the like also diminishes. In summary, natural convection effects are minimized in the "stay zone" in accordance with the present invention.

Furthermore, the reduced indoor air temperature made possible by the present invention means that the relative humidity is higher than otherwise and that the whirl of dust in the stay zones diminishes. These secondary effects probably have a favorable impact on persons having sensitive respiratory tracts or passages (small children, asthmatics and others). Moisture migration through walls, floors and ceiling also diminishes, which should also bring about beneficial effects on the frame of the building.

It is also well known that work injuries arise from performing various office job functions. For example, typists and computer operators often get tensions in the shoulder and upper regions of the back. Experiments conducted with the heating method according to the present invention yielded results which indicate that the extra supply of heat to these anatomical regions, has a favorable effect on these conditions.

In accordance with the present invention, energy conservation arises because transmission losses as well as ventilation losses are reduced when the indoor temperature of a "stay zone" is lowered by about 50° C. Heat energy is supplied to the "stay zone" through radiation or radiant heat. The radiant heat influences the air temperature only indirectly or secondarily and to a minor extent. The invention will be more particularly described in the following in connection with an embodiment illustrated in the annexed drawings.

DETAILED DESCRIPTION OF PREFERRED EMBODIMENTS

Figure 1:
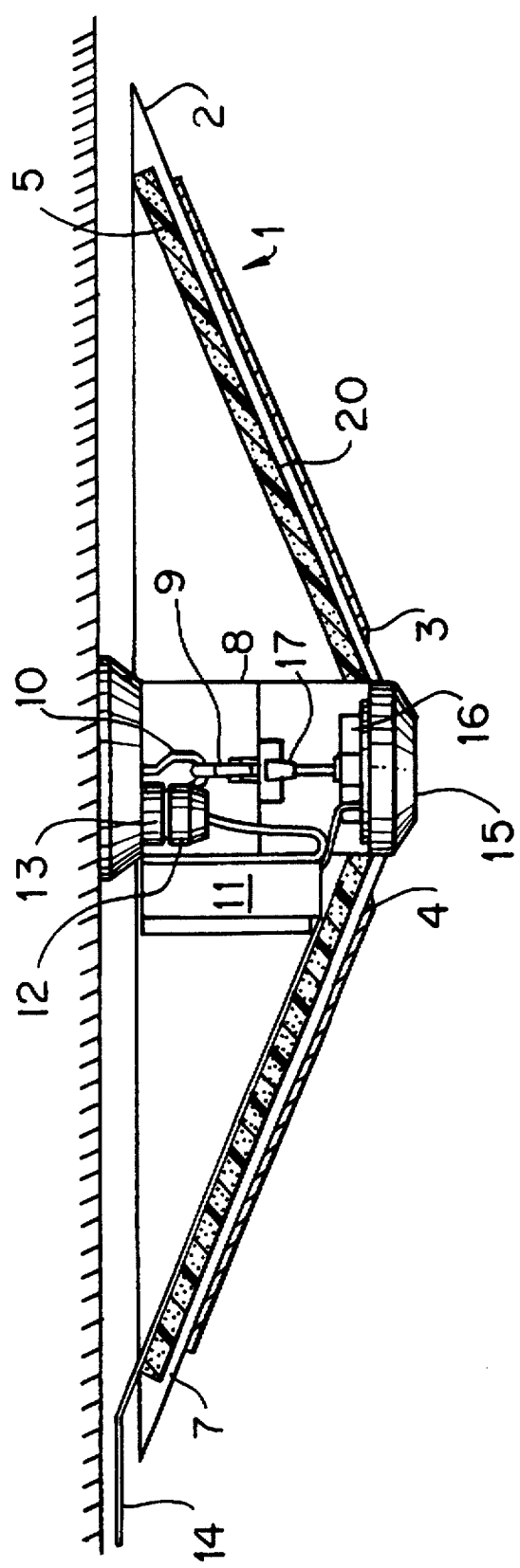
FIG. 1 is a cross sectional view of a heat radiation or radiant heat apparatus according to the invention.

FIG. 1 shows a heat radiating apparatus having an electrical resistance element for producing radiant heat. In this embodiment the element is comprised of a long wire or a band of metallic material which is anchored in a predetermined form on the upper side of a supporting base or backing or carrying part 1. Other alternative embodiments consist in creating the above-mentioned form on the supporting backing 1 by means of printing, spraying or coating. The element may also be integrated in the supporting material or located between the layers of the multi-layered base 1. The supporting base 1 has the shape of an inverted cone with a large central angle. The tip of the cone is cut off, so that the base 1 has a centrally located opening. The supporting material does not contain more mass than is necessary to maintain its shape when maximum power is supplied to a resistive element such, for example, as thermally insulated heating wires. The resistive element preferably has a power of about 1500 watts at 220 volts and a current strength of about 7.5 amperes (A) in cold condition. During heating, the amperage and the power decrease, so that a surface temperature of about 200° C. is attained at a fixed setting and simultaneously the power is decreased to 1400 watts (W) and the amperage to 7 amperes (A).

The support material is secured to a conical metal screen 2. On that side of the screen which faces the element a reflector having the same extension as the support material is secured. The reflector is preferably comprised of a reflective aluminium strip or foil 3 having a thickness of about 0.05 mm. Between the support material and the foil there is an air gap 4 of about 3–5 mm in width. On the other side of the screen 2 there is also an air gap 7, and above the gap 7 there is a conically shaped insulation 5 which is about 10 mm thick and is preferably comprised of foamed polyurethane. That surface of the insulation which faces the screen is preferably coated as, for example, by spraying a very thin, reflecting aluminum layer 20. The air gap 7 between the screen and the insulation is about 10 mm wide.

Towards the center, the conical metal screen 2 is affixed to a cylinder 8, which may be made of the same material as the screen 2. A fastening member 9 designed for fastening the cylinder 8 and the conical screen 2 together and anchors the entire assembly to a hook 10 in the ceiling.

A control unit 11 is preferably secured to the outside of the cylinder 8. The control unit 11 is connected to an electric terminal 13 in the ceiling through a crown contact plug 12. The resistance element 1 is also connected to the control unit 11. Above the entire apparatus a thermistor 14 is provided near the ceiling. The thermistor senses the indoor air temperature, and is electrically connected to the control unit 11.

Near the center of the apparatus a sensor (e.g. an infrared sensor or IR-detector) 15 is provided, and at the rear or upper side of which a potentiometer 16 is centrally attached. The tip of the potentiometer is secured near the center of the cylinder through a snap lock 17. The sensor or detector and the potentiometer 16 are electrically connected to the control unit 11. With this arrangement one can change the setting of the potentiometer by simply turning the IR-detector. Varying the settings of the potentiometer changes the pre-set comfort level of the heat radiation apparatus.

Figure 2A:
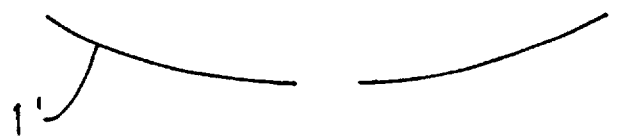
FIGS. 2A–2C are cross sectional views illustrating schematically the various outer geometric shapes of the radiant heat apparatus of FIG. 1.
Figure 2B:

The outer form or shape of the apparatus is essential for the apparatus to function effectively. This shape can vary depending on the particular use in question. Examples of different forms of outer shapes are shown schematically in FIGS. 2A–2C. Common to these forms is that the outer shape of the apparatus is not planar but projects upwardly from the horizontal plane so that it forms a cone-like shape as is depicted by the embodiment of FIG. 1. Alternatively, it forms a portion of a sphere (see FIG. 2A) or has other shapes (see FIGS. 2B and 2C). In all these embodiments the apparatus preferably has a centrally located opening 6 for the mounting of the sensor 15 so that sensor 15 is not directly influenced by the radiant heat from the radiant heat apparatus.

Figure 2C:
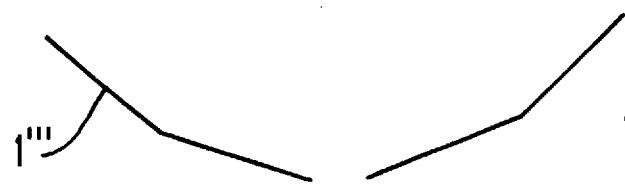
Figure 3:
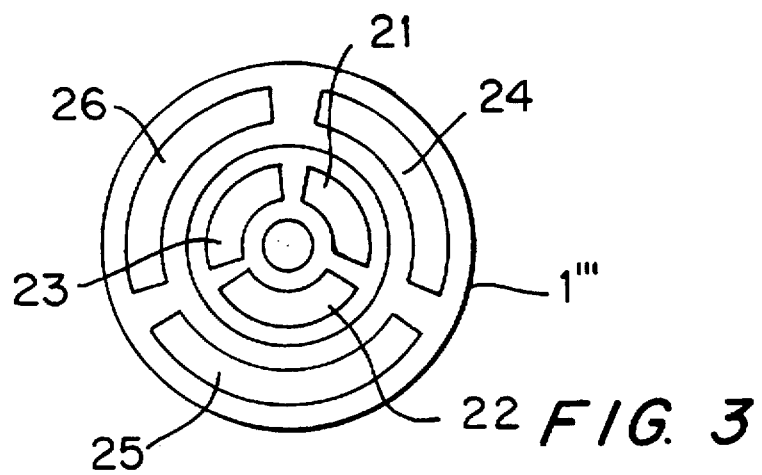
FIG. 3 is a plan view of a diagrammatic representation of a power distribution pattern of the radiant heat apparatus of FIG. 1.

FIG. 3 shows a plan view of a possible placement of the resistive elements on a supporting base 1'" of FIG. 2C. The different heating zones, of which the element is subdivided, are illustrated only diagrammatically. The supporting base 1'" of this embodiment is also provided with an opening 6 for the sensor 15. The base 1'" is divided into two sections, each section having a different inclination with respect to a horizontal plane. Within each of these sections the resistive element is further sub-divided into three zones such, for example, as the central heating zones 21, 22 and 23 of one section are located in the central area and heating zones 24, 25 and 26 of another section are positioned in the outer area. The different zones can be constructed so that different surface temperatures and accordingly different heat radiation can be provided by the different sections, areas and/or zones. It is further provided that the apparatus can also be provided with a sensor which can control the resistive elements in such a way that only certain portions of the elements are heated.

Figure 4:
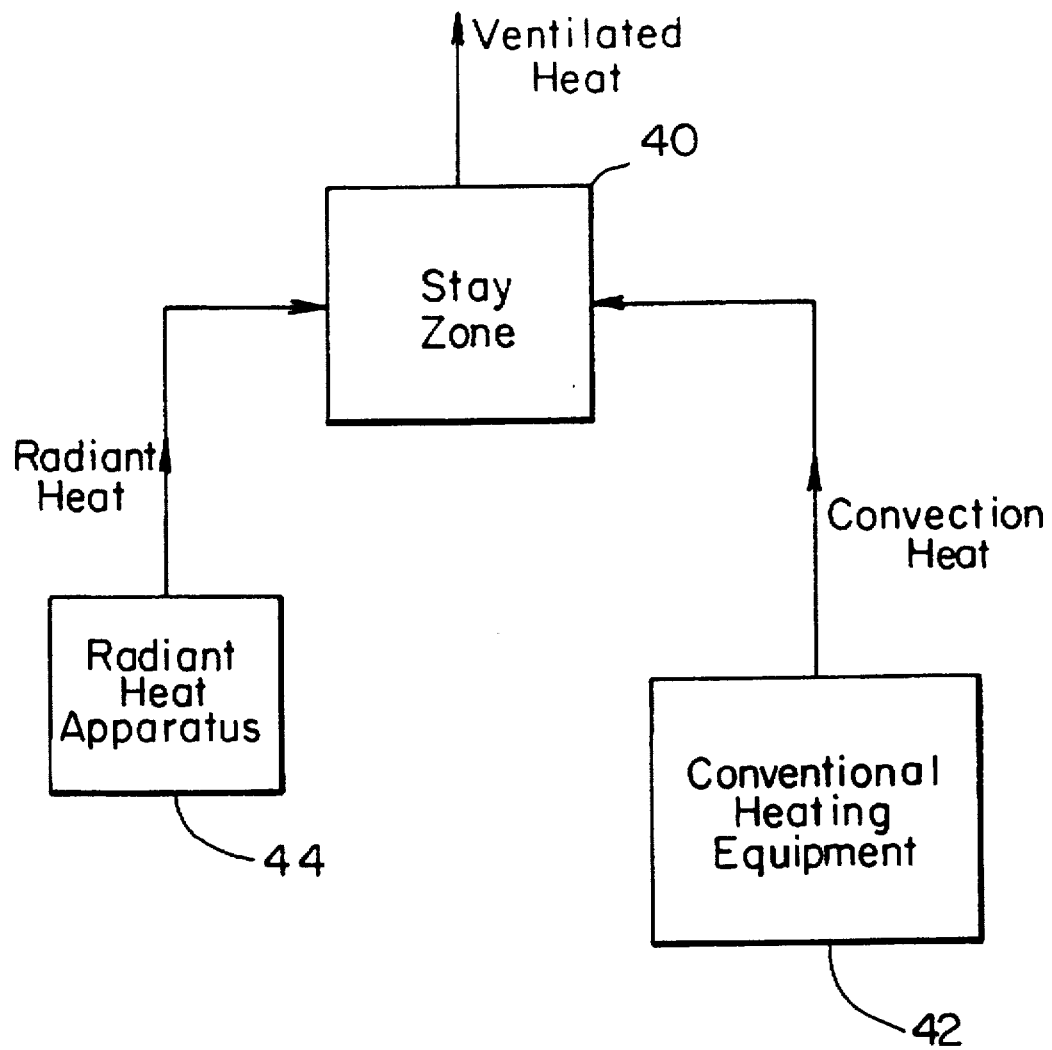
FIG. 4 is a schematic representation of the heating system in accordance with the present invention.

FIG. 4 depicts schematically an energy conserving method and system for heating a "stay zone" 40 using a conventional heating equipment 42 and a radiant heat apparatus 44 in accordance with the present invention. The conventional heating equipment 42 provides convection heat to the "stay zone" 40 so that the air temperature thereof is held to a constant temperature of about 5°C below a temperature in the range of about 18° C. to 23° C. The stay zone 40 is further heated to a physiological-comfort level by the radiant heat apparatus 44 when a sensor detects a person entering and/or staying in the stay zone 40. Ventilated heat escapes from the stay zone 40 by way of, for example, ventilation.

I claim:

1. An energy conserving method of heating a stay zone where a person enters and stays at least temporarily, comprising the steps of:

a. heating air in the stay zone with a heating system so that the stay zone has a temperature of about 5° C. below a room temperature, said room temperature being in a range of about 18° C. to 23° C.;

b. activating a radiant heat apparatus upon detecting with a sensor the person entering the stay zone; and c. uniformly and diffusely radiating heat energy into the stay zone from a radiating surface of the radiant heat apparatus located above the stay zone so that the person coming from another zone having a temperature range of about 18° C. to 23° C. acquires very rapidly a feeling of an uninterrupted physiological-comfort level of warmth.

2. The method of claim 1, wherein step c includes radiating heat energy having a wave length of about 0.8 μm to 800 μm.

3. The method of claim 1, further including discontinuing the radiating step when the absence of the person in the stay zone is detected by the sensor.

4. An energy conserving heating system for heating a stay zone that is at least temporarily occupied by a person, comprising:

a thermostatically controlled heating equipment for heating the air in the stay zone to about 5° C. below a room temperature, said room temperature being in a range of about 18° C. to 23° C., said equipment being operatively connected to the stay zone; and a radiant heat apparatus disposed proximate a ceiling level of the stay zone for radiantly and diffusely emitting heat in the zone in addition to the heat supplied by said thermostatically controlled heating equipment so that the person coming from another zone having a temperature range of about 18° C. to 23° C. acquires very rapidly a feeling of an uninterrupted physiological-comfort level of warmth, said radiant heat apparatus including:

a carrying part having an outer surface;

an electrically and thermally insulated heating wire disposed on said outer surface for radiating heat;

at least one of reflective strip and reflective foil mounted on said outer surface so as to reflect the radiant heat into the zone; and a sensor positioned proximate said carrying part for activating said radiant heat apparatus, said sensor being responsive to a person's presence in the zone.

5. The system of claim 4, wherein said outer surface of said radiant heat apparatus includes a cone-like shape.

6. The system of claim 4, wherein said outer surface of said radiant heat apparatus includes a convex shape.

7. The system of claim 4, wherein said sensor is arranged centrally in said radiant heat apparatus such that said sensor is not directly influenced by the radiant heat from said radiant heat apparatus.

8. The system of claim 4, wherein said sensor is an infrared-type detector.

9. The energy conserving heating system of claim 4, wherein the wavelength of the radiant energy is about 0.8 μm to 800 μm.

* * * * *